April 5, 1938.  E. J. GLENNON  2,112,983
CARD GAME PRACTICE APPARATUS
Filed Feb. 2, 1938  2 Sheets-Sheet 1
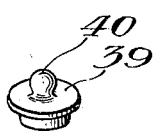
Inventor:
Edward J. Glennon,
By: Belt, Wallace & Cannon,
Attorneys April 5, 1938.  E. J. GLENNON  2,112,983
CARD GAME PRACTICE APPARATUS
Filed Feb. 2, 1938  2 Sheets-Sheet 2
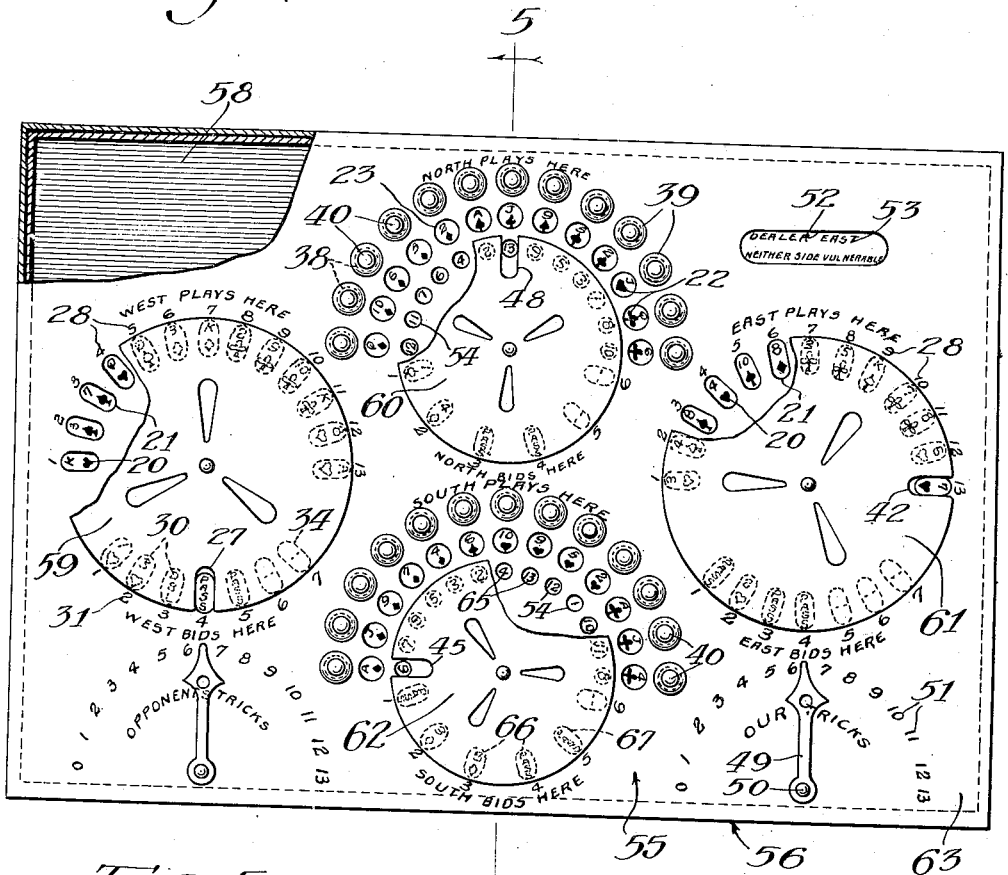
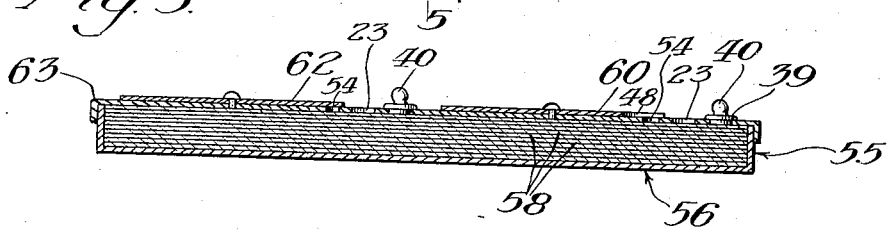
Inventor:
Edward J. Glennon
By Belt, Wallace & Cannon
Attorneys Patented Apr. 5, 1938

2,112,983

UNITED STATES PATENT OFFICE 2,112,983

CARD GAME PRACTICE APPARATUS

Edward J. Glennon, Chicago, Ill., assignor of one-half to Thord B. Steffanson, Chicago, Ill.

Application February 2, 1938, Serial No. 188,213

26 Claims. (Cl. 35—8)

This invention relates to a card game practice or teaching apparatus.

An object of the present invention is to provide an improved card game practice or teaching apparatus of the type which may be used by a single person for the purpose of teaching himself the game of bridge or other card games in accordance with the practice of experts in the particular game.

I am aware of the fact that heretofore in the art various types of card game practice or teaching apparatus, for use by an individual person, have been provided, and among such prior art devices is an apparatus which includes a case and a sheet to be placed within the case and having indicia printed thereon representing a typical bridge game. Formed in the top or playing board of the case are four groups of slots through which card indicia on the sheet may be seen, under conditions which will be explained hereafter. Arranged in each of these slots is a slide and each of these slides is adapted to conceal or obturate at different times a corresponding one of the card indicia on the sheet and a numerical indicium representing the sequence in which such card would be played during the game by an expert, and at the start of the game the slides in two of the four groups or hands, that is, in the two hands which represent the opponents, are so positioned that they conceal or obturate the card indicia corresponding thereto while at the same time exposing to view the numerical indicia representing the sequence in which the cards in the opponent's hands are to be played. However, the slides representing the player's own hand are so positioned that they reveal the card indicia in the player's hand, and the slides in the other group, representing the dummy hand, are, of course, concealed until the "West" player, that is, the player at the dealer's left, makes his play whereupon the slides in the dummy hand are moved to expose the card indicia therein, following the customary practice in bridge.

In addition to the four groups of slides referred to above the sheet embodied in the said prior art apparatus is provided with bidding indicia and these bidding indicia may be seen, under certain conditions to be referred to hereinafter, through slots which are formed in the top wall or playing board of the case. Arranged in each of these last-mentioned slots is a slide by means of which the bidding indicia associated therewith may be selectively and successively exposed to view during the bidding operation. Accordingly, when the learner, that is, a person attempting to teach himself the game of bridge in accordance with the accepted practice of experts, desires to use this prior art apparatus, with the slides positioned as explained above, he moves the bidding slides in the proper order, so as to expose, through their respective slots, the bidding indicia corresponding to each player's bid and, as will be mentioned hereafter, these bidding indicia remain exposed to view after each bidding because the bidding indicia for each player are successively exposed to view by movement of the corresponding bidding slide.

The player then moves the No. 1 slide in the "West" hand, which is considered as being the first hand at the player's left, whereupon he then moves all of the slides in the dummy hand into position to expose all of the card indicia in the dummy hand, following the accepted and usual practice in bridge.

The player thereupon selects a particular card indicium from the dummy or "North" hand, and moves the corresponding slide, thereby exposing to view a particular numerical indicium, previously concealed, which indicates whether or not the player has played from the dummy hand the card which an expert would have played if he were playing the typical bridge game printed on the sheet.

Following the foregoing play from the dummy hand the player then moves the No. 1 slide in the "East" hand, to expose the corresponding card indicium. He thereupon selects a particular card indicium from his own or "South" hand whereupon he moves the corresponding slide which indicates to him whether or not he has played from his own hand the card which an expert bridge player would have played.

It will be seen, therefore, from the foregoing, that in so far as the use of the dummy or "North" hand and his own or "South" hand, for the purpose of instruction, are concerned, the prior art apparatus referred to above is based upon correct and approved bridge practice because once the player makes a card selection from the dummy or "North" hand and from his own or "South" hand, and moves the corresponding slides in these hands, the selected cards, that is, the card indicia pertaining thereto, are concealed and remain concealed throughout the remainder of the game.

However, there is an objection to the use of the prior art apparatus referred to above, in the use of the opponents' hands, that is, in the use of the "West" and "East" hands, and this objection resides in the fact that once the player has made a card selection from either of the opposing players, that is, from either the "West" or the "East" hand, and has moved the corresponding slides in such hands, the card indicia represented by the thus selected and moved slides remain exposed to view throughout the remainder of the game, so that the player can see at a glance at any stage of the game all of the cards which have been played from the hands of his opponents, and this is contrary to good bridge practice because in good bridge practice, which the beginner or other person is attempting to learn from the use of the apparatus, and as is well known, the player must learn to remember the cards which have been played from all four hands because he is not permitted to examine the cards, once they have been played, and have been taken in as tricks, to ascertain which cards have been played.

Another object to the use of the prior art apparatus referred to above resides in the fact that in the use of the same the bidding indicia are at all times exposed to view during the bidding operation so that the player is at all times enabled to see at a glance, during the bidding operation, all previous bids which have been made and this is, of course, contrary to good bridge practice in which the player should learn to remember the bids which have been made by the various players.

Hence it will be seen, from the foregoing explanation, that there are two serious objections to the use of the prior art apparatus referred to above, namely, (a) it exposes to the player's view throughout the entire game all of the cards which have been played from his hands, that is, from the "East" and "West" hands, and hence teaches him an incorrect practice in bridge; and (b) it exposes to the player's view during the bidding operation all of the bids which have been made during the same, thus teaching the player another incorrect bridge practice.

An important object of the present invention, therefore, is to provide a new and improved card game practice apparatus, especially adapted for teaching a learner or beginner the game of bridge, and which in use is not subject to, and in fact overcomes, the objections referred to above relative to and which are inherent in the use of the aforesaid prior art apparatus.

An additional object of the present invention is to provide a new and improved card game practice apparatus, which is especially adapted for teaching a person the game of bridge, and in which the player is taught correct practice and theory of bridge in that he is compelled to remember not only the cards which have been played from his own hand and from the dummy hand, as in the prior art apparatus hereinbefore referred to, but also the cards which have been played from the hands of his opponents, that is, from the "East" and "West" hands.

A further object of the present invention is to provide a new and improved card or bridge game practice apparatus in the use of which the bidding indicia are at all times concealed from the player's view, except during the operation of bidding in each hand, so that the player is taught correct bridge practice in that he is compelled to learn to memorize the various bids which have been made in each hand, that is, by each player.

There are, in addition to the foregoing, still other objections to the use of the prior art bridge practice apparatus referred to above and among these objections are the fact that the slides which are used in the same are frequently difficult to move, that is, they bind in their slots, they frequently cut the paper sheet on which the typical game is printed, and in moving the same the players frequently break or tear their finger nails, which is especially objectionable to women bridge players.

Accordingly, still another object of the present invention is to provide a new and improved bridge practice apparatus in the use of which the last-mentioned objectionable feature incidental to the use of the slides in the aforesaid prior art apparatus is entirely eliminated, in which no slides are employed, and in which the devices or discs and associated parts which take the place of the slides are easily and readily manipulated without any danger or possibility of tearing or otherwise damaging the player's finger nails.

Another disadvantage inherent in the prior art apparatus referred to above is the fact that it is relatively expensive to manufacture because, among other reasons, of the time and labor involved in installing the numerous slides employed in the same in position of use; it being understood, in this connection, that the prior art apparatus referred to employs approximately fifty-six (56) slides.

Another object of the present invention, therefore, is to provide a new and improved bridge practice apparatus which is relatively simpler and less expensive in construction than the prior art apparatus hereinbefore referred to, from the standpoint of both time, labor and material required to construct the same, because, for one reason, of the fact that it does not employ any slides and is much simpler and less expensive in construction from the standpoint of both time and labor involved.

Another object of the present invention is to provide a new and improved card game practice apparatus which is more convenient and facile in operation than the prior art apparatus referred to above in that it employs four rotatable discs and associated parts in place of, and to accomplish the same results accomplished by, the relatively large number of slides employed in the prior art apparatus.

A further object of the present invention is to provide a card game practice or teaching apparatus, especially designed for teaching or practicing the game of bridge, and by the use of which the user or player acquires experience which more closely approaches that which he would obtain by actually playing the game than any of the prior art devices with which applicant is familiar.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a top plan view of a preferred form of the new card game or bridge practice or teaching apparatus, showing parts of the four discs embodied in the same broken away to reveal the slots or openings formed in the playing board or top wall of the case, and showing part of the playing board or top wall broken away so as to reveal or disclose the typical game sheets arranged therebelow;

Fig. 2 is a transverse vertical sectional view on line 2—2 in Fig. 1;

Fig. 3 is a perspective view of one of the pegs or blocks which are embodied in the new apparatus;

Fig. 4 is a top plan view, similar to Fig. 1, but showing a slightly modified form of the invention; and Fig. 5 is a transverse vertical sectional view of the modified form of the invention shown in Fig. 4, and is taken on line 5—5 in Fig. 4.

A preferred form of the new card or bridge game practice apparatus is shown in Figs. 1, 2 and 3 of the drawings, is therein generally indicated at 10, and comprises a case or frame 11 which is shown as being substantially rectangular in shape although it may, of course, have any desired shape or form. This frame 11 includes side walls 12 and 13, end walls 14 and 15, a bottom wall 64, and a top wall 16, all of which parts may be made of wood, metal, or any other desired material. Provided in the frame or case 11, between the top and bottom walls 16 and 29, is a space or slot 17 into which a paper or analogous sheet 18 may be inserted through the end 19 of this slot 18 which opens at, that is, through the end wall 15 of the case or frame 11. This sheet 18 bears upon one or both sides thereof, as may be desired, a printed representation of a typical card game such, for example, as a game of bridge, as the same would be played by an expert and, as may be seen from an inspection of Fig. 1, the typical card game illustrated is a bridge game in which each of the four hands is arranged, that is, printed, upon the sheet 18 in the form of an arc of a circle, that is, in a generally semi-circular fashion. Thus, the "East" and the "West" or opponents' hands each include a plurality of card indicia which represent all of the cards in a player's hand which, in a typical bridge game, as shown, is thirteen cards, the "North" hand represents the dummy hand, and "South" represents the player's own hand.

Provided on the upper surface of the playing board or top wall 16 of the case, in any suitable manner, as by printing, in association with the "East" and "West" hands, is a series of numbers or numerical indicia 28, and formed on the board 16, one adjacent each of the numerical indicia 28, are rows of slots or sight openings 21; each of these numbers 28 representing the sequence or order in which the cards in the "East" and "West" hands, that is, in the hands of the opposing players would be played by an expert in the particular game.

Likewise provided on the typical game sheet 18, in association with the "East" and "West" hands, are bidding indicia 30, and provided in the top wall 16 of the case 11, above each of the bidding indicia 30, is a sight opening 34.

Similarly, bidding indicia 66 are provided on the sheet 18, in association with the "North" and "South" hands, and provided in the top wall 16 of the case 11, above each of the bidding indicia 66, is a sight opening 67 (Fig. 1) which represent the various bids which an expert in the particular game would make if playing the typical game illustrated on the sheet 18, and each of these bidding indicia 30 is identified by a number 31 which is inscribed on the upper surface of the playing board 16. Provided in the top wall 16 of the case 11, one above each of the bidding indicia 30, is a sight opening 66. It will be understood, in this connection, that these numerical indicia 31 represent the numerical sequence in which the various bids in the "East" and "West" or opponent's hands are made during the bidding operation.

Similarly, bidding indicia 34 and 36 are provided on the sheet 18 in association with the "North" and "South" hands, and these bidding indicia 34 are identified by numerical indicia 35 which are printed on the upper surface of the top wall 16 of the case 11 and these indicia 35 represent the numerical order or sequence in which the bids are made during the bidding operation.

Provided in the playing board 16, above each of the card indicia 20, associated with the "East" and "West" or opponents' hands, is a sight opening or hole 21 through which the corresponding card indicium therebelow may be seen, under conditions to be described hereinafter, and, likewise provided in the playing board, that is, in the top wall of the case, above each of the card indicia 22 is a sight opening or hole 23 through which the indicia 22 are normally exposed to view, as will be explained presently.

Provided in the top wall 16 of the case or frame 11, in association with the "North" or dummy hand is a generally semi-circular shaped row of sight openings or pockets 23 and printed on the sheet 18 below each of the sight openings or pockets 23 is a card indicium 22. Likewise provided in the top wall 16 of the case 11, in association with each of the "North" and "South" hands is a row of recesses or pockets 38 which are of the same or approximately the same size and shape as the sight openings 23, and normally arranged in each of these pockets 38 is an obturating element in the form of a peg or block 39 (Fig. 3), each of these pegs 39 including a finger grip or knob 40.

Also formed in the top wall 16 of the case 11, below each of the "North" and "South" discs 46 and 43, respectively, is a row of holes or sight openings 54 (Fig. 1), and printed on the sheet 18, in alignment or registration with these sight openings 54, are numerical indicia 65 which represent the numerical order or sequence in which the cards represented by the card indicia 22 and pegs 39 should be played.

Rotatably mounted upon the playing board, that is, in the top wall or cover plate 16 of the case, as at 24, and in association with the "West" hand, is a rotatable member in the form of a disc 25, and provided in the peripheral edge 26 of this disc 25 is a sight opening in the form of a notch 27. A similar disc 40 is rotatably mounted, as at 41, on the top wall 16 of the case or frame 11, in association with the "East" hand, and provided in the peripheral edge of this disc 40 is a sight opening in the form of a cut-out portion or notch 42.

Likewise, a disc 43 is rotatably mounted upon the playing board or top wall 16 of the frame or case 11, in association with the "South" hand, and the peripheral edge of this disc 43 is provided with a cut-out portion or sight opening 45. A similar disc 46 is rotatably mounted upon the top wall 16 of the case or frame 11, as at 47, in association with the "North" hand, and this disc is provided with a sight opening in the form of a notch 48 in its peripheral edge.

If desired, suitable tabulating devices may be provided on the playing board 16 for keeping a record of the number of tricks taken by each side, and two such devices are shown, the same having the form of indicators which are pivotally mounted on the board 16, as at 50, and are movable over, and relative to, numbers 51 which represent the numbers of tricks taken by each side. However, these devices are not essential to the present invention and may be omitted entirely, if desired.

Also, if desired, a sight opening 52 may be provided in the playing board 16 and suitable well known bridge indicia 53 may be provided on the typical game sheet 18 in association therewith. However, these elements 52—53 are likewise not essential to the present invention and may be eliminated entirely, if desired.

*Operation*

In the use of the new bridge or other card game practice apparatus which is shown in the drawings, and referring now particularly to the preferred form of the invention which is shown in Figs. 1 to 3, inclusive, a sheet 18 having a typical bridge or other card game printed thereon is inserted into the slot 17 by way of the open end 19 of the same.

Accordingly, in order to play a typical card game, such as bridge, printed upon the sheet 18, the user, representing the "South" player, and being considered, for the purpose of this illustration as the dealer, rotates the discs 43, 25, 46 and 40, in the order named, (in a counterclockwise direction as seen in Fig. 1), until the notches 45, 27, 48 and 42, respectively, in the same, are disposed in registration with the corresponding sight openings 67, 34, 66 and 34, and the initial or No. 1 bidding indicia 30, 66, 30 and 66, respectively, in each hand thus disclosing the four groups of bidding indicia 30 which are printed on the board 16, one group in association with each hand, and thereby teaching the player or user of the new apparatus the various bids which an expert in the particular game would make if playing the typical game illustrated on the sheet 18. The discs 25, 46, 40 and 43 are then moved into the No. 2 bidding positions, and so on, until the bidding called for by the typical game printed on the sheet 18 has been completed and it will be noted, in this connection, that the said typical game which is printed on the sheet 18 is so designed that the "South" player wins the bid and hence plays both his own hand and his partner's hand, that is, the dummy or "North" hand as seen in Fig. 1.

The player, who is considered as holding the "South" hand, and as having won the bid, then, upon examining his own or "South" hand, commences play by rotating the "West" disc 25 (clockwise, as seen in Fig. 1) until the sight opening or notch 27 in the same comes into registration with the No. 1 card indicium in the "West" hand, and which, in the typical game illustrated on the sheet 18, is the king of hearts. The player then, as is customary in bridge, exposes the dummy or "North" hand by moving all of the obturating elements or pegs 39 associated with the "North" hand out of the openings or holes 23 in that hand and into the corresponding holes 38, thus exposing all of the card indicia 22 in the dummy or "North" hand, as shown in Fig. 1. The player then, in effect, plays a card from the dummy or "North" hand by selecting a particular card indicium 22 from that hand, whereupon picks up the particular peg or block 39 which corresponds to the selected card indicium 22, and places the same in the particular opening or pocket 23 through which the selected card indicium 22 is visible.

Accordingly, in order to ascertain whether or not he has made a selection from the "North" or dummy hand which corresponds to the play an expert in the particular game would have made, the player then rotates the disc 46 (clockwise, Fig. 1) until the notch or sight opening 48 therein comes into alignment or registration with the particular card indicium 22 in the "North" hand which has been selected, and the corresponding obturating element or peg 39 which has been moved, whereupon, if the selection the player has made would be that which an expert in the particular game would make, the notch or sight opening 48 in the disc 46 will be disposed in registration with, and will reveal the number "1" indicium 65, which will then be visible through the corresponding sight opening 54, thus indicating that for this first or No. 1 play in the dummy or "North" hand the player has made the correct play.

Accordingly, the disc 40 in the "East" hand is then rotated (clockwise, Fig. 1) until the sight opening or notch 42 therein moves into registration with No. 1 position, as represented by the corresponding indicium 28, so as to represent "East's" play, whereupon the player plays from his own or "South" hand by selecting a particular card indicium 22 therein, then moving the corresponding peg 39 from its normal position in one of the holes 38 into the corresponding pocket or sight opening 23, and finally rotating the disc 43 (clockwise, Fig. 1) until the sight opening or notch 45 therein comes into alignment or registration with the particular card indicium 22 which has been selected and the corresponding peg 39 which has been moved. The player will thereupon discover that the particular numerical indicium 65 on the sheet 18, which is then visible through the corresponding sight opening 54 and the notch 45 in the disc 43 (and which should be No. 1) will inform him as to whether or not he has made the play from his own or the "South" hand which an expert in the particular game would make and, in the event that he has not made the proper play, it is contemplated to provide with the present invention a booklet, or possibly printed instructions on the sheet 18, containing information which will advise the player why he should have made a different play, and why he was in error in making the particular play which he made.

The foregoing operations are then repeated until the typical bridge game which is printed or otherwise illustrated on the sheet 18 has been played, whereupon the sheet 18 may be slipped out of the slot 17 through the open end 19 thereof and reversed, it being contemplated by the present invention that another typical bridge game shall be printed on the opposite side of the sheet 18.

A record of the tricks taken by the player in his own or "South" hand, and in his partner's dummy or "North" hand, may be kept by manipulating the indicator 49 which is located in the lower right hand corner, as seen in Fig. 1, and a record of the tricks taken by the opposing side, that is, by the "East" and "West" hands, may be kept by manipulating the other indicator 49 which is shown in the lower left hand corner, as seen in Fig. 1.

A modified form of the present invention is shown in Figs. 4 and 5, is therein generally indicated at 55, and comprises a case or frame 56 which, it is contemplated, may be made from such relatively inexpensive material as cardboard, paperboard or the like, although it may, of course, be made from metal, wood or other material, as may also the case 11.

The modified form of the invention which is shown in Figs. 4 and 5 is very similar to the form of the invention which is shown in Figs. 1, 2 and 3, except for two principal differences which are: (1) the fact that in the modified form of the invention which is shown in Figs. 4 and 5 the case or frame 56 is made in the form and shape of an ordinary cardboard or paperboard box which is designed to hold a stack of typical game sheets 58 which correspond to the sheets 18; and (2) the discs 59, 60, 61 and 62, for the four hands, are rotatably mounted in the cover 63 of the box so that the cover 63 corresponds to the playing board or top wall 16 of the case 11 in the form of the invention which is shown in Figs. 1, 2 and 3. Otherwise, however, the modified form of the invention which is shown in Figs. 4 and 5 is identical to the form of the invention which is shown in Figs. 1, 2 and 3 and hence need not be described in detail.

It will be noted from the foregoing description, taken in conjunction with the accompanying drawings, that the present invention provides a novel bridge game practice or teaching apparatus, which is especially designed for the purpose of enabling a person to teach himself the game of bridge by practicing the same in accordance with the accepted practice of experts, and which is so designed and constructed that it overcomes and eliminates the objectionable features, hereinbefore recited, which are experienced in the use of the prior art apparatus referred to.

It will likewise be noted, from the foregoing description, taken in conjunction with the drawings, that the present invention has the additional advantage over the prior art apparatus, hereinbefore referred to, which resides in the fact that in the use of the same the player is taught correct bridge practice because, as will be noted by reference to Fig. 1, once a particular card indicium 20 or 22 has been selected from either of the player's opponents' hands, that is, from either the "West" hand or the "East" hand, or from either the "North" or the "South" hand, and the corresponding card, in effect, played, by rotating one of the discs 25 or 40, and the corresponding card, in effect, played, by moving one of the obturating elements or pegs 39, the thus selected card indicium 20 or 22 becomes concealed from the player's view and remains concealed throughout the remainder of the game, thereby teaching the player to remember the cards which have been played, which is in accordance with the correct theory and practice of the game of bridge as played by experts.

It will further be noted from the foregoing description, taken in conjunction with the accompanying drawings, that the present invention has the added advantage over the prior art apparatus hereinbefore referred to which resides in the fact that the various bidding indicia 31 and 35, which represent the previous bids in all four hands, are concealed during the bidding operation so that the player is required and taught to learn to memorize the bids which have been made and hence is taught correct bridge practice, as distinguished from the incorrect practice of bidding which is incidental to the use of the prior art apparatus hereinbefore referred to and in which all of the previous bids made by each of the players is at all times exposed to the player's view during the bidding operation.

Another advantage inherent in the present invention resides in the fact that not only are the numerous slides of the prior art apparatus eliminated but the discs 25 and 46 in the opponents' or "West" and "East" hands serve the dual purpose of not only obturating or concealing all of the previously selected card indicia 20 associated with each of these hands, but of also obturating or concealing all of the previously bid bidding indicia 30 and sight openings 34 associated with each of these hands.

It will also be noted that the discs 46 and 43 in the "North" and "South" hands not only function to conceal or obturate all of the previously selected numerical indicia 65 and sight openings 54 but also all of the previously bid bidding indicia 66 and sight openings 67 associated with these hands.

It will also be noted that the discs 25, 46, 40, 43, etc., and the pegs 39, are relatively much easier to manipulate than the numerous slides of the prior art apparatus referred to above, and may be operated without any danger of breaking or tearing the user's finger nails, a fact which is of especial importance to women bridge players.

Furthermore, by reason of the fact that it embodies relatively few moving parts, and no slides, the present invention is relatively much less expensive to manufacture, from the standpoint of the time, labor and material required in manufacturing and assembling the same, than is the prior art apparatus hereinbefore referred to.

It will therefore be seen from the foregoing description, taken in conjunction with the drawings, that the present invention accomplishes all of its intended objects, which have been stated hereinbefore, and overcomes the difficulties involved in the use of the prior art apparatus, and which difficulties have hereinbefore been pointed out.

While I have illustrated and described preferred forms of construction for carrying my invention into effect, these are capable of variation and modification, without departing from the spirit of the invention. I, therefore, do not wish to be limited to the precise details of construction set forth, but desire to avail myself of such variations and modifications as come within the scope of the appended claims.

I claim:

1. In a card game practice apparatus of the type which includes a sheet marked with playing card indicia arranged to represent a plurality of players' hands in a card game: a case adapted to enclose the said sheet and including a portion provided with sight openings through which the said card indicia may be seen, when the said sheet is in the said case, and a plurality of manually operable discs rotatably mounted upon the said case, one in association with each of said hands, and each of said discs normally overlying and concealing all of the said sight openings and card indicia in the corresponding one of said hands, each of said discs having a sight opening therein and each of the said sight openings in said discs being adapted to be moved, by rotation of the corresponding one of said discs, into selective alignment or registration with the said first-mentioned sight openings and card indicia in the corresponding one of said hands so as to selectively expose the said card indicia to the view of the user of the said apparatus.

2. In a card game practice apparatus of the type which includes a sheet marked with playing card indicia arranged to represent a plurality of players' hands in a card game: a case adapted to enclose the said sheet and including a portion provided with sight openings through which the said card indicia may be seen, when the said sheet is in the said case, and a plurality of manually operable discs rotatably mounted upon the said case, one in association with each of said hands, and each of said discs normally overlying and concealing all of the said sight openings and card indicia in the corresponding one of said hands, each of said discs having a notch formed therein in its peripheral edge and each of the said notches being adapted to be moved, by rotation of the corresponding one of said discs, into selective alignment or registration with the said sight openings and card indicia in the corresponding one of said hands so as to selectively expose the said card indicia to the view of the user of the said apparatus.

3. In a bridge practice apparatus of the type which includes a sheet marked with playing card indicia arranged to represent a plurality of players' hands in a bridge game: a case adapted to enclose the said sheet and including a portion provided with sight openings through which the said card indicia may be seen, when the said sheet is in the said case, said apparatus including a plurality of manually operable discs rotatably mounted upon the said case, one in association with each of said hands, and each of said discs normally overlying and concealing all of the said sight openings and card indicia in the corresponding one of said hands, each of said discs having a sight opening therein and each of the said sight openings in said discs being adapted to be moved, by rotation of said discs, into selective alignment or registration with the said first-mentioned sight openings and card indicia in the corresponding one of said hands so as to selectively expose the said card indicia to the view of the user of the said apparatus.

4. In a bridge practice apparatus of the type which includes a sheet marked with playing card indicia arranged to represent a plurality of players' hands in a bridge game: a case adapted to enclose the said sheet and including a portion provided with sight openings through which the said card indicia may be seen, when the said sheet is in the said case, said apparatus including a plurality of manually operable discs rotatably mounted upon the said case, one in association with each of said hands, and each of said discs normally overlying and concealing all of the said sight openings and card indicia in the corresponding one of said hands, each of said discs having a notch formed therein in its peripheral edge and each of the said notches being adapted to be moved, by rotation of said discs, into selective alignment or registration with the said sight openings and card indicia in the corresponding one of said hands so as to selectively expose the said card indicia to the view of the user of the said apparatus.

5. In a card game practice apparatus of the type which includes a sheet marked with playing card indicia arranged to represent a plurality of players' hands and in which the sheet is also marked with bidding indicia: a case adapted to enclose the said sheet and including a portion provided with sight openings through which the said card indicia may be seen, when the said sheet is in the said case, the said overlying portion of the said case also being provided with other sight openings through which the said bidding indicia may be seen, and a manually operable disc rotatably mounted upon the said case in association with each of said hands and each of said discs normally overlying and concealing all of the said sight openings and all of the said card indicia and all of the said bidding indicia associated with the corresponding one of said hands, each of said discs having a sight opening therein and each of the said sight openings in said discs being adapted to be moved, by rotation of said discs, into selective alignment or registration with the said first-mentioned sight openings and the said card indicia, as well as into selective alignment or registration with the said second-mentioned sight openings and the said bidding indicia, so as to selectively expose the said card indicia and the said bidding indicia, at different times, to the user of the said apparatus.

6. In a card game practice apparatus of the type which includes a sheet marked with playing card indicia arranged to represent a plurality of players' hands and in which the sheet is also marked with bidding indicia: a case adapted to enclose the said sheet and including a portion provided with sight openings through which the said card indicia may be seen, when the said sheet is in the said case, the said overlying portion of the said case also being provided with other sight openings through which the said bidding indicia may be seen, and a manually operable disc rotatably mounted upon the said case in association with each of said hands and each of said discs normally overlying and concealing all of the said sight openings and all of the said card indicia and all of the said bidding indicia associated with the corresponding one of said hands, each of said discs having a notch formed therein and each of the said notches being adapted to be moved, by rotation of said discs, into selective alignment or registration with the said first-mentioned sight openings and the said card indicia, as well as into selective alignment or registration with the said second-mentioned sight openings and the said bidding indicia, so as to selectively expose the said card indicia and the said bidding indicia, at different times, to the user of the said apparatus.

7. In a bridge game practice apparatus of the type which includes a sheet marked with playing card indicia arranged to represent a plurality of players' hands in a bridge game and in which the said sheet is also marked with a numerical indicium for each card indicium of each hand and in which the said numerical indicia indicate the sequence in which the cards represented by the said card indicia would be played by an expert in playing the particular hand shown on the said sheet: a case adapted to enclose the said sheet and including a portion provided with sight openings through which the said card indicia may be seen, when the said sheet is in the said case, the said overlying case portion also being provided with other sight openings through which the said numerical indicia may be seen, and a plurality of manually operable discs rotatably mounted upon the said case, one in association with each of said hands, each of the said discs normally overlying and concealing all of the second-mentioned sight openings and the said numerical indicia, but none of the first-mentioned sight openings and the said card indicia, associated with the corresponding one of said hands, each of said discs having a notch formed in its peripheral edge and each of the said notches being adapted to be moved, by rotation of the said discs, into selective alignment or registration with the said numerical indicia so as to selectively expose the latter to the view of the user of the said apparatus, the said apparatus also including a group of obturating or indicia-concealing elements associated with each of the said hands and the said obturating or indicia-concealing elements being adapted to be selectively and manually placed in or removed from the said first-mentioned sight openings so as to conceal or expose the card indicia which are normally visible therethrough.

8. In a bridge game practice apparatus of the type which includes a sheet marked with playing card indicia arranged to represent a plurality of players' hands in a bridge game and in which the said sheet is also marked with a numerical indicium for each card indicium of each hand and in which the said numerical indicia indicate the sequence in which the cards represented by the said card indicia would be played by an expert in playing the particular hand shown on the said sheet: a case adapted to enclose the said sheet and including a portion provided with sight openings through which the said card indicia may be seen, when the said sheet is in the said case, the said overlying case portion also being provided with other sight openings through which the said numerical indicia may be seen, and a plurality of manually operable discs rotatably mounted upon the said case, one in association with each of said hands, each of the said discs normally overlying and concealing all of the second-mentioned sight openings and the said numerical indicia, but none of the first-mentioned sight openings and the said card indicia, associated with the corresponding one of said hands, each of said discs having a sight opening formed therein and each of the said sight openings in the said discs being adapted to be moved, by rotation of the said discs, into selective alignment or registration with the said numerical indicia so as to selectively expose the latter to the view of the user of the said apparatus, the said apparatus also including a group of obturating or indicia-concealing elements associated with each of the said hands and the said obturating or indicia-concealing elements being adapted to be selectively and manually placed in or removed from the said first-mentioned sight openings so as to conceal or expose the card indicia which are normally visible therethrough.

9. In a bridge game practice apparatus of the type which includes a sheet marked with playing card indicia arranged to represent a plurality of players' hands in a bridge game and in which the said sheet is also marked with a numerical indicium for each card indicium of each hand and in which the said numerical indicia indicate the sequence in which the cards represented by the said card indicia would be played by an expert in playing the particular hand shown on the said sheet: a case adapted to enclose the said sheet and including a portion provided with sight openings through which the said card indicia may be seen, when the said sheet is in the said case, the said overlying case portion also being provided with other sight openings through which the said numerical indicia may be seen, and a plurality of manually operable discs rotatably mounted upon the said case, one in association with each of said hands, each of the said discs normally overlying and concealing all of the second-mentioned sight openings and the said numerical indicia, but none of the first-mentioned sight openings and the said card indicia, associated with the corresponding one of said hands, each of said discs having a notch formed in its peripheral edge and each of the said notches being adapted to be moved, by rotation of the said discs, into selective alignment or registration with the said numerical indicia so as to selectively expose the latter to the view of the user of the said apparatus, the said apparatus also including a group of obturating or indicia-concealing elements associated with each of the said hands and the said obturating or indicia-concealing elements being adapted to be selectively and manually placed in or removed from the said first mentioned sight openings so as to conceal or expose the card indicia which are normally visible therethrough, the said overlying portion of said case having a group of recesses or pockets formed therein in association with each of said hands and the said pockets or recesses being adapted to receive and hold the said obturating or indicia-concealing elements when the latter are disposed in the position which they assume at the commencement of card play from the said hands.

10. In a bridge game practice apparatus of the type which includes a sheet marked with playing card indicia arranged to represent a plurality of players' hands in a bridge game and in which the said sheet is also marked with a numerical indicium for each card indicium of each hand and in which the said numerical indicia indicate the sequence in which the cards represented by the said card indicia would be played by an expert in playing the particular hand shown on the said sheet: a case adapted to enclose the said sheet and including a portion provided with sight openings through which the said card indicia may be seen, when the said sheet is in the said case, the said overlying case portion also being provided with other sight openings through which the said numerical indicia may be seen, and a plurality of manually operable discs rotatably mounted upon the said case, one in association with each of said hands, each of the said discs normally overlying and concealing all of the second-mentioned sight openings and the said numerical indicia, but none of the first-mentioned sight openings and the said card indicia, associated with the corresponding one of said hands, each of said discs having a sight opening formed therein and each of the said sight openings in the said discs being adapted to be moved, by rotation of the said discs, into selective alignment or registration with the said numerical indicia so as to selectively expose the latter to the view of the user of the said apparatus, the said apparatus also including a group of obturating or indicia-concealing elements associated with each of the said hands and the said obturating or indicia-concealing elements being adapted to be selectively and manually placed in or removed from the said first mentioned sight openings so as to conceal or expose the card indicia which are normally visible therethrough, the said overlying portion of said case having a group of recesses or pockets formed therein in association with each of said hands and the said pockets or recesses being adapted to receive and hold the said obturating or indicia-concealing elements when the latter are disposed in the position which they assume at the commencement of card play from the said hands.

11. In a bridge game practice apparatus of the type which includes a sheet marked with playing card indicia arranged to represent a plurality of players' hands in a bridge game and in which the said sheet is also marked with a numerical indicium for each card indicium of each hand and in which the said numerical indicia indicate the sequence in which the cards represented by the said card indicia would be played by an expert in playing the particular hand shown on the said sheet: a case adapted to enclose the said sheet and including a portion provided with sight openings through which when the said sheet is in the said case the said card indicia may be seen, the said overlying case portion also being provided with other sight openings through which the said numerical indicia may be seen, the said overlying portion of said case being provided with additional sight openings through which the said bidding indicia may be seen, and a plurality of manually operable discs rotatably mounted upon the said case, one in association with each of said hands, each of the said discs normally overlying and concealing all of the second-mentioned sight openings and the said numerical indicia and all of the said third-mentioned sight openings and the said bidding indicia, but none of the first-mentioned sight openings and the said card indicia, associated with the corresponding one of said hands, each of said discs having a notch formed in its peripheral edge and each of the said notches being adapted to be moved, by rotation of the said discs, into selective alignment, or registration with the said numerical indicia so as to selectively expose the latter to the view of the user of the said apparatus, the said apparatus also including a group of obturating or indicia-concealing elements associated with each of the said hands and the said obturating or indicia-concealing elements being adapted to be selectively and manually placed in or removed from the said first mentioned sight openings so as to conceal or expose the card indicia which are normally visible therethrough.

12. In a bridge game practice apparatus of the type which includes a sheet marked with playing card indicia arranged to represent a plurality of players' hands in a bridge game and in which the said sheet is also marked with a numerical indicium for each card indicium of each hand and in which the said numerical indicia indicate the sequence in which the cards represented by the said card indicia would be played by an expert in playing the particular hand shown on the said sheet; a case adapted to enclose the said sheet and including a portion provided with sight openings through which when the said sheet is in the said case the said card indicia may be seen, the said overlying case portion also being provided with other sight openings through which the said numerical indicia may be seen, the said overlying portion of said case being provided with additional sight openings through which the said bidding indicia may be seen, and a plurality of manually operable discs rotatably mounted upon the said case, one in association with each of said hands, each of the said discs normally overlying and concealing all of the second-mentioned sight openings and the said numerical indicia and all of the said third-mentioned sight openings and the said bidding indicia, but none of the first-mentioned sight openings and the said card indicia, associated with the corresponding one of said hands, each of said discs having a sight opening formed therein and each of the said sight openings in the said discs being adapted to be moved, by rotation of the said discs, into selective alignment or registration with the said numerical indicia so as to selectively expose the latter to the view of the user of the said apparatus, the said apparatus also including a group of obturating or indicia-concealing elements associated with each of the said hands and the said obturating or indicia-concealing elements being adapted to be selectively and manually placed in or removed from the said first-mentioned sight openings so as to conceal or expose the card indicia which are normally visible therethrough.

13. In a card game practice apparatus of the type which includes a sheet marked with indicia arranged in the form of players' hands and pertaining to a card game: a case adapted to enclose the said sheet, a plurality of manually operable members rotatably mounted upon the said case, one in association with each of said hands, said case including a portion overlying the said sheet and having sight openings therein through which the said indicia may be seen, when the said sheet is in the said case, each of the said manually operable members normally overlying and concealing at least some of the said sight openings and some of the said indicia associated with the corresponding one of said hands, each of the said members having a sight opening therein and the sight openings in said members being adapted to be moved, by rotation of the said members, into selective alignment or registration with at least some of the said sight openings and some of the said indicia in the corresponding one of said hands.

14. In a card game practice apparatus of the type which includes a sheet marked with indicia arranged in the form of players' hands and pertaining to a card game: a case adapted to enclose the said sheet, a plurality of manually operable members rotatably mounted upon the said case, one in association with each of said hands, said case including a portion overlying the said sheet and having sight openings therein through which the said indicia may be seen, when the said sheet is in the said case, each of the said manually operable members normally overlying and concealing at least some of the said sight openings and some of the said indicia associated with the corresponding one of said hands, each of the said members having a notch formed therein in its peripheral edge and the said notches being adapted to be moved, by rotation of the said members, into selective alignment or registration with at least some of the said sight openings and some of the said indicia in the corresponding one of said hands.

15. In a card game practice apparatus of the type which includes a sheet marked with playing card indicia and with bidding indicia and in which the said indicia are arranged in the form of players' hands: a case adapted to enclose the said sheet and including a portion provided with sight openings through which the said card indicia may be seen, when the said sheet is in the said case, the said overlying portion of said case being provided with other sight openings through which the said bidding indicia may be seen, and a plurality of manually operable discs rotatably mounted upon the said case, one in association with each of said hands, each of the said discs normally overlying and concealing certain ones of the said first-mentioned sight openings and card indicia and all of the said second-mentioned sight openings and bidding indicia in the corresponding one of said hands, each of the said discs having a notch formed therein in its peripheral edge and the said notches being adapted to be moved, by rotation of said discs, into selective alignment or registration with the said certain ones of the said first-mentioned sight openings and card indicia and into selective alignment or registration with all of the said second-mentioned sight openings and bidding indicia in the corresponding one of said hands, some of the said first-mentioned sight openings and card indicia in certain of the said hands lying radially outwardly from or beyond the peripheral edges of the corresponding ones of said discs, and the said apparatus including manually operable indicia-concealing or obturating elements insertable into and removable from those of the said first-mentioned sight openings which are disposed radially outwardly from or beyond the peripheral edges of the corresponding discs so as to conceal or expose the said card indicia which are normally visible therethrough.

16. In a card game practice apparatus of the type which includes a sheet marked with playing card indicia and with bidding indicia and in which the said indicia are arranged in the form of players' hands: a case adapted to enclose the said sheet and including a portion provided with sight openings through which the said card indicia may be seen, when the said sheet is in the said case, the said overlying portion of said case being provided with other sight openings through which the said bidding indicia may be seen, and a plurality of manually operable discs rotatably mounted upon the said case, one in association with each of said hands, each of the said discs normally overlying and concealing certain ones of the said first-mentioned sight openings and card indicia and all of the said second-mentioned sight openings and bidding indicia in the corresponding one of said hands, each of the said discs having a sight opening formed therein and the said sight openings in the said discs being adapted to be moved, by rotation of said discs, into selective alignment or registration with the said certain ones of the said first-mentioned sight openings and card indicia and into selective alignment or registration with all of the said second-mentioned sight openings and bidding indicia in the corresponding one of said hands, some of the said first-mentioned sight openings and card indicia in certain of the said hands lying radially outwardly from or beyond the peripheral edges of the corresponding ones of said discs, and the said apparatus including manually operable indicia-concealing or obturating elements insertable into and removable from those of the said first mentioned sight openings which are disposed radially outwardly from or beyond the peripheral edges of the corresponding discs so as to conceal or expose the said card indicia which are normally visible therethrough.

17. In an apparatus of the character described and which includes a sheet marked with game indicia: a case adapted to enclose the said sheet and including a portion adapted to overlie the said sheet and provided with sight openings through which the said game indicia may be seen when the said sheet is in the said case, and a plurality of concealing elements manually insertable into and removable from the said sight openings so as selectively to conceal or expose the said game indicia.

18. In an apparatus of the character described and which includes a sheet marked with game indicia: a case adapted to enclose the said sheet and including a portion adapted to overlie the said sheet and provided with sight openings through which the said game indicia may be seen when the said sheet is in the said case, the said case portion also being provided with a plurality of sockets, and a plurality of concealing elements normally disposed in the said sockets but manually removable therefrom and insertable into the said sight openings so as to conceal the said game indicia.

19. In a game practice apparatus of the type which includes a sheet marked with game indicia arranged to represent a pair of players' hands: a case adapted to enclose the said sheet and including a portion adapted to overlie the said sheet and provided with sight openings through which the said game indicia may be seen when the said sheet is in the said case, and a pair of manually operable members movably mounted upon the said case, one in association with each of said hands, each of said members having a sight opening formed therein through which the said game indicia may be selectively exposed to view through the said first-mentioned sight openings by manually moving the said members.

20. In a game practice apparatus of the type which includes a sheet marked with game indicia arranged to represent a pair of players' hands: a case adapted to enclose the said sheet and including a portion adapted to overlie the said sheet and provided with sight openings through which the said game indicia may be seen when the said sheet is in the said case, and a pair of manually operable members movably mounted upon the said case, one in association with each of said hands, each of said members having a notch formed therein through which the said game indicia may be selectively exposed to view through the said first-mentioned sight openings by manually moving the said members.

21. In a game practice apparatus of the type which includes a sheet marked with game indicia arranged to represent a pair of players' hands: a case adapted to enclose the said sheet and including a portion adapted to overlie the said sheet and provided with sight openings through which the said game indicia may be seen when the said sheet is in the said case, and a pair of manually operable discs rotatably mounted upon the said case, one in association with each of said hands, each of said discs having a sight opening formed therein through which the said game indicia may be selectively exposed to view through the said first-mentioned sight openings by manually rotating the said discs.

22. In a game practice apparatus of the type which includes a sheet marked with game indicia arranged to represent a pair of players' hands: a case adapted to enclose the said sheet and including a portion adapted to overlie the said sheet and provided with sight openings through which the said game indicia may be seen when the said sheet is in the said case, and a pair of manually operable discs rotatably mounted upon the said case, one in association with each of said hands, each of said discs having a notch formed therein in its peripheral edge and through which the said game indicia may be selectively exposed to view through the said first-mentioned sight openings by manually rotating the said discs.

23. In a game practice apparatus of the type which includes a sheet marked with game indicia: a case adapted to enclose the said sheet and provided with sight openings through which the said game indicia may be seen when the said sheet is in the said case, and a manually operable member movably mounted upon the said case and having a sight opening therein through which the said game indicia may be selectively exposed to view through the said first-mentioned sight openings by manually moving the said member.

24. In a game practice apparatus of the type which includes a sheet marked with game indicia: a case adapted to enclose the said sheet and provided with sight openings through which the said game indicia may be seen when the said sheet is in the said case, and a manually operable member rotatably mounted upon the said case and including a peripheral edge portion having a notch formed therein through which the said game indicia may be selectively exposed to view through the said first-mentioned sight openings by manually rotating the said member.

25. In a game apparatus of the type which includes a member bearing game indicia: an opaque member adapted to be disposed over the indicia-bearing member and having at least two sight openings therein through which game indicia on the indicia-bearing member may be revealed when the opaque member covers the indicia-bearing member, and at least two members movably mounted on the opaque member, each movable member being associated with a sight opening in the opaque member to conceal indicia revealable through such sight opening, and each movable member having a sight opening therein positionable with respect to the associated sight opening in the opaque member to reveal game indicia normally concealed by the movable member associated with said sight opening in the opaque member.

26. In a game apparatus of the type which includes a member bearing game indicia: an opaque member adapted to be disposed over the indicia-bearing member and having at least two sight openings therein through which game indicia on the indicia-bearing member may be revealed when the opaque member covers the indicia-bearing member, and at least two discs rotatably mounted on the opaque member, each disc being associated with a sight opening in the opaque member to conceal indicia revealable through such sight opening, and each disc having a sight opening therein positionable with respect to the associated sight opening in the opaque member to reveal game indicia normally concealed by the disc associated with said sight opening in the opaque member.

EDWARD J. GLENNON.